United States Patent
O'Hern et al.

(10) Patent No.: US 10,091,245 B2
(45) Date of Patent: Oct. 2, 2018

(54) DECOUPLING HARDWARE AND SOFTWARE COMPONENTS OF NETWORK SECURITY DEVICES TO PROVIDE SECURITY SOFTWARE AS A SERVICE IN A DISTRIBUTED COMPUTING ENVIRONMENT

(71) Applicant: AT&T Intellectual Property I, L.P., Atlanta, GA (US)

(72) Inventors: William A. O'Hern, Spring Lake, NJ (US); Edward G. Amoroso, Andover, NJ (US); Michelle Barry, Odessa, FL (US); Anthony Ramos, Gainesville, VA (US); Daniel Solero, Mooresville, IN (US); Duncan Kirkwood Sparrell, Oakton, VA (US); Rodney Dilts, West River, MD (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 166 days.

(21) Appl. No.: 15/276,225

(22) Filed: Sep. 26, 2016

(65) Prior Publication Data

US 2017/0013020 A1    Jan. 12, 2017

Related U.S. Application Data

(63) Continuation of application No. 13/949,695, filed on Jul. 24, 2013, now Pat. No. 9,456,003.

(51) Int. Cl.
*H04L 29/06*    (2006.01)
*H04W 12/08*    (2009.01)
*G06F 9/455*    (2018.01)

(52) U.S. Cl.
CPC .......... *H04L 63/20* (2013.01); *G06F 9/45558* (2013.01); *H04L 63/10* (2013.01); *H04W 12/08* (2013.01); *G06F 2009/4557* (2013.01)

(58) Field of Classification Search
CPC ....................................................... H04L 63/20
See application file for complete search history.

(56) References Cited

U.S. PATENT DOCUMENTS 6,457,076 B1    9/2002  Cheng
6,873,988 B2    3/2005  Herrmann et al.
(Continued)

FOREIGN PATENT DOCUMENTS

CA    2397911 C    5/2007
EP    1579617 A2   5/2010
(Continued)

OTHER PUBLICATIONS

"Keeping Control Isn't Easy, Chapter 4: Cloud-Based Infrastructure," Jo Maitland, Publication Date: Oct. 2009, 13 pages. [Retrieved from: http://media.techtarget.com/Syndication/NATIONALS/Cloud_ebook_CH4_0809_v4.pdf].

(Continued)

*Primary Examiner* — Kambiz Zand
*Assistant Examiner* — Thanh Le
(74) *Attorney, Agent, or Firm* — Hartman & Citrin LLC

(57) ABSTRACT

Concepts and technologies are disclosed herein for decoupling hardware and software components of network security devices to provide security software as a service in a distributed computing environment. A computer system includes a processor that can execute computer-executable instructions to perform various operations. The processor can perform operations to provide security services to one or more customer platforms. The operations can include receiving a network security software component from a security service provider, and deploying the network security software component within a distributed computing environment so that the network security software component can be executed by a computing resource of the (Continued)

distributed computing environment to provide a security service to the customer platform(s). The network security software component includes a software component that has been decoupled from a hardware component of a network security device by the security service provider.

20 Claims, 12 Drawing Sheets

(56) References Cited

U.S. PATENT DOCUMENTS

| | | | |
|---|---|---|---|
| 7,290,145 | B2 | 10/2007 | Falkenthros |
| 7,433,835 | B2 | 10/2008 | Frederick et al. |
| 7,580,946 | B2 | 8/2009 | Mansour et al. |
| 7,603,548 | B2 | 10/2009 | Patrick et al. |
| 7,698,430 | B2 | 4/2010 | Jackson |
| 7,949,871 | B2 | 5/2011 | Randle et al. |
| 8,104,083 | B1 | 1/2012 | Sobel et al. |
| 8,276,137 | B2 | 9/2012 | Doyle et al. |
| 8,321,936 | B1 | 11/2012 | Green et al. |
| 8,332,922 | B2 | 12/2012 | Dickinson et al. |
| 8,424,094 | B2 | 4/2013 | Neystadt et al. |
| 8,528,058 | B2 | 9/2013 | Zhu et al. |
| 8,676,710 | B2 | 3/2014 | Mane et al. |
| 8,763,140 | B2 | 6/2014 | Marcus et al. |
| 8,826,289 | B2 | 9/2014 | Muller |
| 8,843,571 | B2 | 9/2014 | Ravichandran et al. |
| 8,881,223 | B2 | 11/2014 | Hudis et al. |
| 8,924,723 | B2 | 12/2014 | Chang et al. |
| 8,943,319 | B2 | 1/2015 | Chang et al. |
| 8,966,017 | B2 | 2/2015 | Wipfel et al. |
| 8,973,090 | B1 | 3/2015 | Banerjee |
| 9,021,453 | B1 | 4/2015 | Zhang |
| 9,119,017 | B2 | 8/2015 | Sinha |
| 9,129,086 | B2 | 9/2015 | Betz et al. |
| 9,275,365 | B2 | 3/2016 | Misovski et al. |
| 9,294,437 | B1 | 3/2016 | Ganguly et al. |
| 9,489,647 | B2 | 11/2016 | Martinez et al. |
| 9,590,959 | B2 | 3/2017 | Roth et al. |
| 9,614,748 | B1 | 4/2017 | Battersby et al. |
| 9,658,868 | B2 | 5/2017 | Hill |
| 2002/0107809 | A1 | 8/2002 | Biddle et al. |
| 2003/0065557 | A1 | 4/2003 | Hoffman et al. |
| 2003/0172145 | A1 | 9/2003 | Nguyen |
| 2004/0255167 | A1 | 12/2004 | Knight |
| 2005/0044197 | A1 | 2/2005 | Lai |
| 2005/0050337 | A1 | 3/2005 | Liang et al. |
| 2006/0021018 | A1 | 1/2006 | Hinton et al. |
| 2006/0069912 | A1 | 3/2006 | Zheng et al. |
| 2006/0107036 | A1 | 5/2006 | Randle et al. |
| 2006/0206932 | A1 | 9/2006 | Chong |
| 2006/0206940 | A1 | 9/2006 | Strauss et al. |
| 2007/0011723 | A1 | 1/2007 | Chao |
| 2007/0039053 | A1 | 2/2007 | Dvir |
| 2007/0067620 | A1 | 3/2007 | Jevans |
| 2007/0226150 | A1 | 9/2007 | Pietrzak et al. |
| 2007/0266433 | A1 | 11/2007 | Moore |
| 2009/0089078 | A1 | 4/2009 | Bursey |
| 2009/0288084 | A1 | 11/2009 | Astete et al. |
| 2009/0300641 | A1 | 12/2009 | Friedman et al. |
| 2010/0169497 | A1 | 7/2010 | Klimentiev et al. |
| 2010/0332617 | A1 | 12/2010 | Goodwin et al. |
| 2012/0011077 | A1 | 1/2012 | Bhagat |
| 2013/0144744 | A1 | 6/2013 | Astete et al. |
| 2014/0012751 | A1 | 1/2014 | Kuhn et al. |
| 2014/0115578 | A1 | 4/2014 | Cooper et al. |

FOREIGN PATENT DOCUMENTS

| | | |
|---|---|---|
| EP | 1896978 B1 | 6/2016 |
| KR | 101145766 B1 | 5/2012 |

OTHER PUBLICATIONS

Subashini, S., et al. article entitled "A Survey on Security Issues in Service Delivery Models of Cloud Computing," Elsevier, Journal of Network and Computer Applications, vol. 34.1 (2011), pp. 1-11. [Retrieved from: https://pdfs.semanticscholar.org/1f19/46887c8be228864ee23374bc0b427abf0884.pdf].

Casper, et al., article entitled "MarketScope for Managed Security Services in Europe," Gartner Research, Stamford, Connecticut, Gartner, Inc., Publication Date: Sep. 30, 2010, 22 pages. [Retrieved from: http://insight.datamaticstech.com/dtlsp/Confirmit/Gartner/11132/marketscope_for_managed_secu_206878.pdf].

Garber, Lee, article entitled "The Challenges of Securing the Virtualized Environment," Published by the IEEE Computer Society, Jan. 2012, pp. 17-20 [Retrieved from: http://ieeexplore.ieee.org/iel5/2/6127981/06127992.pdf].

Roschke, et al., article entitled "An Advanced IDS Management Architecture," Published in the Journal of Information Assurance and Security, vol. 5, (2010), pp. 246-255. [Retrieved from: http://citeseerx.ist.psu.edu/viewdoc/download?doi=10.1.1.182.6223&rep=rep1&type=pdf].

"Amazon Web Services: Overview of Security Processes," Whitepaper, May 2011, 24 pages. [Retrieved from: http://www.utdallas.edu/~muratk/courses/cloud11f_files/AWS_Security_Whitepaper.pdf].

Oberheide, et al., Abstract entitled "Virtualized In-Cloud Security Services for Mobile Devices," Whitepaper, 5 pages. [Retrieved from: http://vhosts.eecs.umich.edu/fjgroup//pubs/mobivirt08-mobilecloud.pdf on Jun. 14, 2017].

"Comcast Unveils Upware: A Cloud-Based Business-to-Business Software Marketplace," Press Release dated Feb. 20, 2013, 2 pages. [Retrieved from: http://corporate.comcast.com/news-information/news-feed/comcast-business-services-unveils-upware-a-cloud-based-business-to-business-software-marketplace-for-small-business-customers].

Article: "Solution Providers Flocking to Amazon Partner Network with AWS Products, Services," (describing Amazon Web Services' launch of Amazon Partner Network launch in 2012). Last updated Nov. 2013, 6 pages. [Retrieved from: : http://searchitchannel.techtarget.com/feature/Solution-providers-flocking-to-Amazon-partner-network-with-AWS-products-services].

Article: "Web Security Services Put to the Test," (review of cloud-based web security-as-a-service offerings). Dec. 2010, 11 pages. [Retrieved from: http://www.networkcomputing.com/networking/web-security-services-put-test/1030620612].

Peter Mell, Timothy Grance, "The NIST Definition of Cloud Computing," National Institute of Standards and Technology, U.S. Department of Commerce, Special Publication 800-145, Sep. 2011, Computer Security Division, Information Technology Laboratory, National Institute of Standards and Technology, Gaithersburg, MD 20899-8930.

Office Action dated Oct. 6, 2015 in U.S. Appl. No. 13/949,695.

Notice of Allowance dated May 10, 2016 in U.S. Appl. No. 13/949,695.

DECOUPLING HARDWARE AND SOFTWARE COMPONENTS OF NETWORK SECURITY DEVICES TO PROVIDE SECURITY SOFTWARE AS A SERVICE IN A DISTRIBUTED COMPUTING ENVIRONMENT

CROSS-REFERENCE TO RELATED APPLICATIONS

This application is a continuation of and claims priority to U.S. patent application Ser. No. 13/949,695, entitled "Decoupling Hardware and Software Components of Network Security Devices to Provide Security Software as a Service in a Distributed Computing Environment," filed Jul. 24, 2013, now U.S. Pat. No. 9,456,003, which is incorporated herein by reference in its entirety.

BACKGROUND

This application relates generally to network security. More specifically, the disclosure provided herein relates to decoupling hardware and software components of network security devices to provide security software as a service in a distributed computing environment.

Today, many companies interact with their customers, vendors, development communities, and others via the Internet and other networks. These interactions expose companies to a wide range of security threats, many of which are constantly evolving. In an effort to prevent or at least mitigate security threats, companies devote significant financial and engineering resources to deploy and to maintain security appliances within their internal networks and their gateways to public networks such as the Internet.

Many companies deploy a security perimeter that includes multiple security appliances to protect their data, technology infrastructure, and other assets. These appliances are often dedicated hardware devices upon which security software is executed. The security software may provide security functions such as, for example, firewall protection, intrusion detection, intrusion prevention, or authentication. The perimeter-based security model may provide the necessary protection for certain security threats, but as these threats evolve, the ineffectiveness of this model is quickly exposed—that is, for example, the inflexibility to enable rapid deployment of new security appliances and to enable the hardware and/or software of existing security appliances to be updated or otherwise improved to adapt to these evolved security threats.

Furthermore, the increased adoption by companies of the bring-your-own-device policy introduces additional security concerns. For example, allowing an employee to bring his or her smartphone device to work and allowing that device to connect to their company's wireless local area network may introduce malicious software into the company's internal network, often unbeknownst to the employee. With tens, hundreds, or even thousands of devices interacting with a company's internal network on a daily basis, the number of possible security threats from each individual device, let alone any malicious software or rogue code operating within what is perceived to be legitimate software, is likely to increase significantly, and increase the ineffectiveness of the current perimeter-based security model.

SUMMARY

The present disclosure is directed to decoupling hardware and software components of network security devices to provide security software as a service in a distributed computing environment. By decoupling the hardware and software within a network security appliance and moving the software component to a distributed computing environment, security vendors, software developers, and third-party security service providers can benefit from on-demand access to a variety of security services through open application programming interfaces ("APIs"). In this manner, each asset requiring protection can be protected in accordance with the specific security requirements of that asset, instead of the security requirements of the collection of the assets as a whole, as is the case with the perimeter-based security model described above.

According to one aspect of the concepts and technologies disclosed herein, a computer system is disclosed. The computer system can include a processor and a memory that stores computer-executable instructions which, when executed by the processor, cause the processor to perform various operations. The computer system, in some embodiments, is deployed within a distributed computing environment. The computer system, in some other embodiments, is external to and in communication with the distributed computing environment.

The operations can be performed to provide security services to one or more customer platforms. The operations can include receiving a network security software component from a security service provider, and deploying the network security software component within the distributed computing environment so that the network security software component can be executed by the computing resource to provide a security service to the customer platform(s). The network security software component includes a software component that has been decoupled from a hardware component of a network security device by the security service provider.

In some embodiments, the operations may also include exposing an API to the customer platform to provide on-demand access to the security service provided by the network security software component. In addition, the operations may include receiving an API call from the customer platform, and in response, providing the security service to the customer platform. The API call can identify an asset that is associated with the customer platform. The API call can also include a selection of the security service to protect the access. The asset may be real or virtualized.

In some embodiments, the operations may also include provisioning the network security software component to protect an identified asset, and providing the security service to the customer platform to protect the asset.

In some embodiments, the operations may also include receiving a further network security software component from a further security service provider. In these embodiments, the further network security software component has been decoupled from a hardware component of a further network security device by the further security service provider. The operations in these embodiments can also include deploying the further network security software component within the distributed computing environment so that the further network security software component can be executed by the computing resource to provide a further security service to the customer platform. The further security service can be used to provide a previously identified asset and/or a further asset.

According to another aspect of the concepts and technologies disclosed herein, a method performed by the computer system is also disclosed. The method can include the same operations as those described above.

According to yet another aspect, a mobile device is disclosed. The mobile device can include a processor and a memory. The memory can store computer-executable instructions that, when executed by the processor, cause the processor to perform operations. The operations, in some embodiments, can include launching a mobile client and connecting to a security software service platform via the mobile client. The operation can also include calling an API exposed by the security software service platform to request that a security service be enabled for the mobile device. In response to calling the API, the mobile device can perform an operation for receiving instructions to enable the security service.

In some embodiments, the mobile device is a bring-your-own-device device for use within an enterprise network. In these embodiments, the security service can include a traffic routing service that routes traffic originating from the mobile device to a security node operating within a distributed computing environment via control provided by the security service platform. In addition to or as an alternative to the traffic routing service, the security service can enable traffic encryption for traffic originating from the mobile device.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

The following detailed description is directed to decoupling hardware and software components of network security devices to provide security software as a service in a distributed computing environment. By decoupling the hardware and software within a network security appliance and moving the software component to a distributed computing environment, security vendors, software developers, and third-party security service providers can benefit from on-demand access to a variety of security services through open application programming interfaces ("APIs"). In this manner, each asset requiring protection can be protected in accordance with the specific security requirements of that asset, instead of the security requirements of the collection of the assets as a whole, as is the case with the perimeter-based security model described above.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
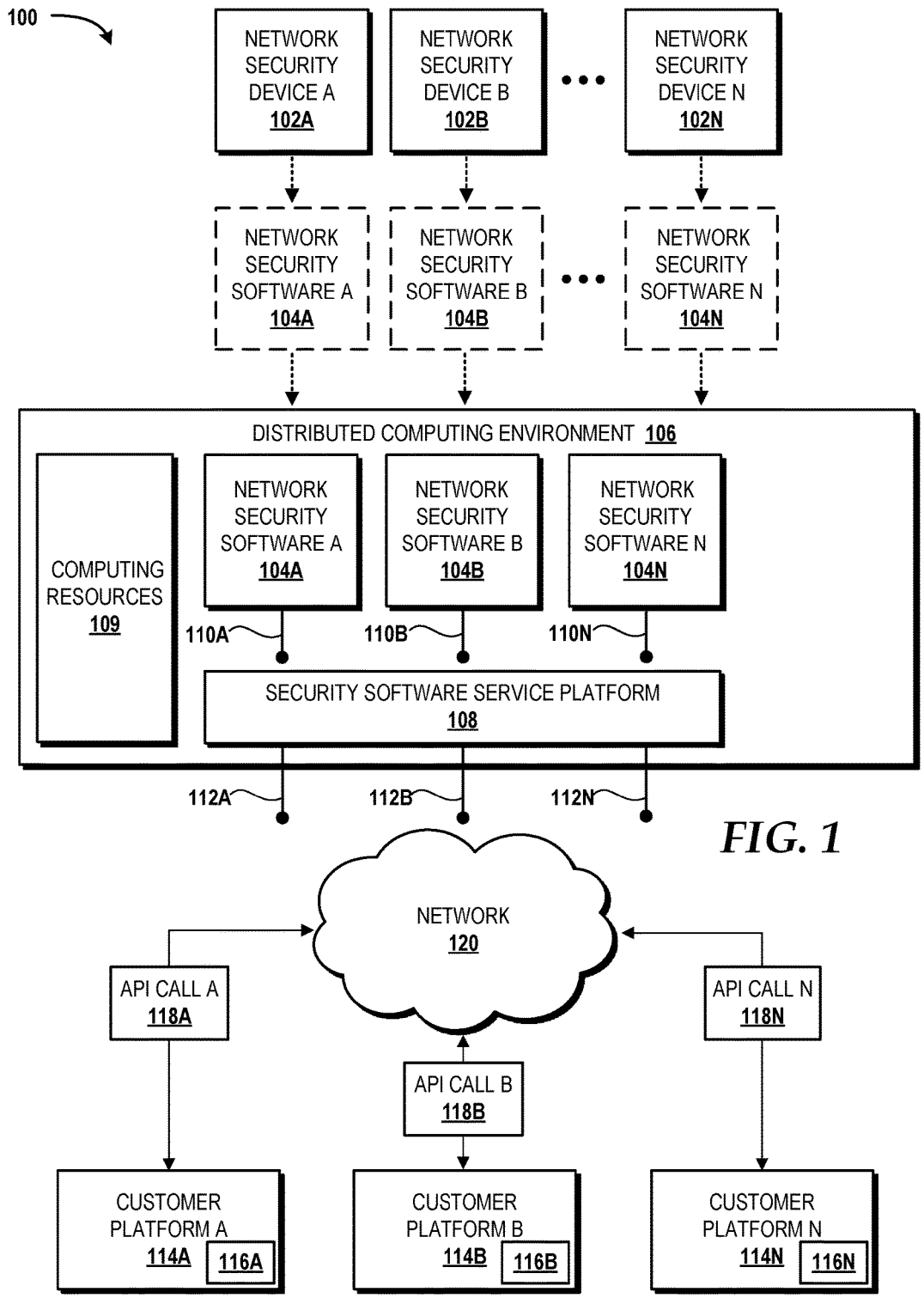
FIG. 1 is a system diagram illustrating an illustrative operating environment for the various embodiments disclosed herein.

Referring now to FIG. 1, aspects of an operating environment 100 for various embodiments of the concepts and technologies disclosed herein for decoupling hardware and software components of network security devices to provide security software as a service in a distributed computing environment will be described, according to an illustrative embodiment. The operating environment 100 shown in FIG. 1 includes a plurality of network security devices 102A-102N (hereinafter referred to collectively and/or generically as "network security devices 102"). The network security devices 102 may include network security appliances that provide various network security functions, including, but not limited to, intrusion prevention functions via intrusion prevention systems ("IPSs"), intrusion detection functions via intrusion detection systems ("IDSs"), firewall functions, virtual private network ("VPN") functions, antivirus functions, spam filtering functions, and content filtering functions. Each of the network security devices 102 may provide one or more of these network security functions.

Each of the network security devices 102 includes hardware components and software components. The hardware components of the network security devices 102 may include, for example, one or more processors, one or more memory components, one or more network connectivity components, one or more input/output components, and one or more power components. These hardware components may be discrete components within the network security devices 102 or may be combined in various combinations, such as, for example, in a system-on-chip ("SoC") configuration. The hardware components, and particularly the processor(s), may execute the software components to provide one or more of the network security functions described above and, in some implementations, additional functions not specifically mentioned above.

Many companies deploy a security perimeter that includes multiple security appliances, such as the network security devices 102, to protect their data, technology infrastructure, and other assets. As discussed above, this perimeter-based security model may provide the necessary protection for certain security threats, but as these threats evolve, the ineffectiveness of this model is quickly exposed—that is, for example, the inflexibility to enable rapid deployment of new security appliances and to enable the hardware and/or software of existing security appliances to be updated or otherwise improved to adapt to these evolved security threats. Furthermore, as discussed above, the increased adoption by companies of the bring-your-own-device policy introduces additional security concerns as the number of possible security threats from each individual device, let alone any malicious software or rogue code operating within what is perceived to be legitimate software, is likely to increase significantly, and increase the ineffectiveness of the current perimeter-based security model.

In an effort to address the aforementioned shortcomings of a perimeter-based security model and for additional reasons, one aspect disclosed herein enables network security software 104A-104N to be decoupled from the hardware components of the network security devices 102A-102N, respectively, in order to provide security functions, such as, for example, those described above within a distributed computing environment 106 via controls provided through a security software service platform 108. More generally, vendors, software developers, third party providers, and others may be encouraged to decouple the software components of their network security appliances and to deploy the software components on the distributed computing environment 106, which operates in accordance with a cloud computing model by which ubiquitous, convenient, and on-demand network access to security services provided by the software components can be achieved through leveraging a shared pool of configurable computing resources to enable rapid provisioning of virtual network security appliances that provide the network security functions previously provided by dedicated network security appliances such as the network security devices 102. In this manner, the distributed computing environment 106 is able to provide on-demand security services via the security software service platform 108, to provide access to these services via a broad range of networks, including wireless and wired wide area networks, and to provide rapid and elastic provisioning and tear down of new security services, as well as resource usage monitoring, alerting, reporting, and domain specific deployment of network security. Additional details regarding the security software service platform 108 are provided herein below with reference to FIG. 3.

The distributed computing environment 106 may provide a shared pool of configurable computing resources ("computing resources") 109, including processing resources, memory resources, storage resources, and networking resources, that can be configured in various ways to support the requirements of the network security software 104 that were previously met by the hardware components of the network security devices 102. In some embodiments, the security software service platform 108 may execute on or otherwise utilize at least a portion of the computing resources 109 provided by the distributed computing environment 106. Alternatively, in some other embodiments, the security software service platform 108 may execute on or otherwise utilize computing resources external to the distributed computing environment 106. For example, the security software service platform 108 may execute on dedicated computing resources or shared computing resources that are external to and in communication with the distributed computing environment 106. As such, the illustrated embodiment shown in FIG. 1 in which the security software service platform 108 is included in the distributed computing environment 106 should not be construed as being limiting in any way.

In some embodiments, a configuration of at least a portion of the computing resources 109 is provided via a web application interface provided on a web site that provides access to configuration functions of the distributed computing environment. Alternatively, in some other embodiments, a configuration of at least a portion of the computing resources 109 is provided via a native application interface provided on a native application that executes on a customer device, as will be described in greater detail below.

In some embodiments, at least a portion of the computing resources 109 is configured in accordance with a configuration template. A configuration template may provide configurations for executing general-use applications, processor-intensive applications, memory-intensive applications, network-intensive applications, storage-intensive applications, or may be specific to applications that provide certain services, such as the security services described herein. In some embodiments, the available security services are provided as part of the template such that a user can select which security services to deploy for a particular identified asset.

The deployment of various security services within the distributed computing environment 106 allows for a unique innovation environment in which the security capabilities provided by multiple security vendors, developers, and/or third parties (hereinafter referred to generally or collectively as "security service providers") are made available within a common platform. This allows security service providers to leverage other technologies to discover and offer new features and/or services that may otherwise be unavailable in the traditional model of dedicated network security appliances. For example, one security service provider may provide an industry-leading firewall application and another security service provider may provide an industry-leading IDS. A customer of the security software service platform 108 can leverage both of these industry-leading services to protect their asset(s). In addition, service providers may elect to utilize capabilities made available by other service providers via the security software service platform to bolster their own offerings. In this manner, new and innovative security service products may be offered to customers via the security software service platform 108.

The unique innovation environment that is created by the deployment of various security services within the distributed computing environment 106 under control of the security software service platform 108 also provides security service providers with additional opportunities to monetize their security service offerings. By way of example, a security service provider may provide their security service(s) via the security software service platform 108 to other security service providers for a fee. Security service providers therefore can monetize their security service offerings not only by providing the security services to customers for the protection of their assets, but also providing the security services to other security service providers. The fee charged from service provider to service provider may be the same as or different than the fee charged to other customers.

The network security software 104A-104N may expose one or more network security software application programming interfaces ("APIs") 110A-110N (hereinafter referred to collectively and/or generically as "network security software APIs 110") to the security software service platform 108. The security software service platform 108 may call one or more of the network security software APIs 110 to request that the network security software 104 perform certain operations. The network security software 104, in turn, may be executed by one or more virtual machines operating on a portion of the computing resources 109 to perform the requested operations and may provide a response. For example, consider the network security software A 104A as being capable of providing IDS functions, and so the security software service platform 108 may call the network security software API 110A that is associated with the network security software A 104A to request that the network security software A 104A initiate the IDS functions, and the network security software A 104A may, in turn, initiate the IDS functions and respond to the security software service platform 108 with confirmation that the IDS functions have been initiated.

The security software service platform 108 may expose one or more security software service APIs 112A-112N (hereinafter referred to collectively and/or generically as "security software service APIs 112") to provide customer platforms 114A-114N (hereinafter referred to collectively and/or generically as "customer platforms 114") access to the security software service platform 108, and more particularly, the security services provided by the network security software 104 being executed in the distributed computing environment 106. According to various embodiments, the functionality of the customer platforms 114 may be provided by one or more server computers, desktop computers, mobile telephones, other mobile devices, laptop computers, set-top boxes, other computing systems, and the like. It should be understood that the functionality of the customer platforms 114 can be provided by a single device, by two similar devices, and/or by two or more dissimilar devices. For purposes of describing the concepts and technologies disclosed herein, the customer platforms 114 may be described herein as server computers, personal computers, mobile devices, or a combination thereof. It should be understood that this embodiment is illustrative, and should not be construed as being limiting in any way.

The customer platforms 114 may execute one or more customer applications 116A-116N (hereinafter referred to collectively and/or generically as "customer applications 116"). The customer applications 116 may initiate API calls 118A-118N (hereinafter referred to collectively and/or generically as "API calls 118") over one or more communications networks ("network 120") to one or more of the security software service APIs 112 to access, via the security software service platform 108, the services provided by the network security software 104 within the distributed computing environment 106. The customer applications 116 may include, for example, web browsers that provide access to one or more websites associated with the security software service platform 108 and/or the distributed computing environment 106 such that a user can provision one or more virtual machines that utilize at least a portion of the computing resources 109 to execute one or more of the network security software 104.

The customer platforms 114 may include individual user devices such as mobile telephones, other mobile devices, laptop computers, set-top boxes, and the like as described above. In addition, the customer platforms 114 can include reseller platforms, enterprise customer platforms, vendor platforms, legacy platforms, billing system platforms, charging system platforms, and the like. Each of these platforms may contain one or more networks, servers, databases, and/or other computing systems.

Reseller platforms may provide a reseller storefront by which customers may, for example, browse security services offered by the security software service platform 108, purchase security services, and read and write reviews for security services. The reseller platforms may be made accessible via one or more websites and/or one or more native applications, including application storefront applications installed on customer mobile devices and/or personal computers, for example.

The enterprise customer platforms may include enterprise customer networks and computing systems. The enterprise customer platforms may include one or more assets to be protected by one or more of the security services offered by the security software service platform 108. Alternatively or additionally, enterprise customers may deploy one or more virtual assets on the distributed computing environment 106.

The vendor platforms may include networks and computing systems of security vendors that decouple the network security software 104 from the hardware of the network security devices 102 and deploy the network security software 104 within the distributed computing environment 106

The legacy platforms may include legacy networks and legacy computing systems of the entity that provides the security software service platform 108. The legacy platforms may interact with the security software service platform 108 to provide the security software service platform 108 access to customer data and other information stored within the legacy network, and/or to provide access to functions of the legacy network, including customer provisioning.

The billing system platforms may include computing systems that may provide billing services to the security software service platform 108 to facilitate billing for security services provided via the security software service platform 108. The charging system platforms may include computing systems that provide charging services to the security software service platform 108 to facilitate charging for security services provided via the security software service platform 108 in accordance with any charging scheme.

The network 120 may be or may include a wireless wide area network ("WWAN"), such as a mobile telecommunications network utilizing one or more mobile telecommunications technologies to provide one or more of the customer platforms 114 access to the security software service platform 108, and to additionally provide voice and/or data services to one or more of the customer platforms 114. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 120 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 120 may be configured to provide voice and/or data communications with any combination of the above technologies. The network 120 may be configured to or adapted to provide voice and/or data communications in accordance with future generation technologies.

The network 120 may be or may include a wireless local area network ("WLAN") operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as "WI-FI"). Draft 802.11 standards are also contemplated. In some embodiments, the WLAN is implemented utilizing one or more wireless WI-FI access points. In some embodiments, one or more of the wireless WI-FI access points is another computing device with connectivity to a WWAN and that is functioning as a WI-FI hotspot. One or more of the customer platforms 114 may securely connect to the network 120 via various encryption technologies including, but not limited, WI-FI Protected Access ("WPA"), WPA2, Wired Equivalent Privacy ("WEP"), and the like.

The network 120 may be or may include a wireless personal area network ("WPAN") operating in accordance with Infrared Data Association ("IrDA"), BLUETOOTH, wireless Universal Serial Bus ("USB"), Z-Wave, ZIGBEE, or some other short-range wireless technology. Additional details regarding the network 120 are provided herein below with reference to FIG. 8.

Figure 2A:
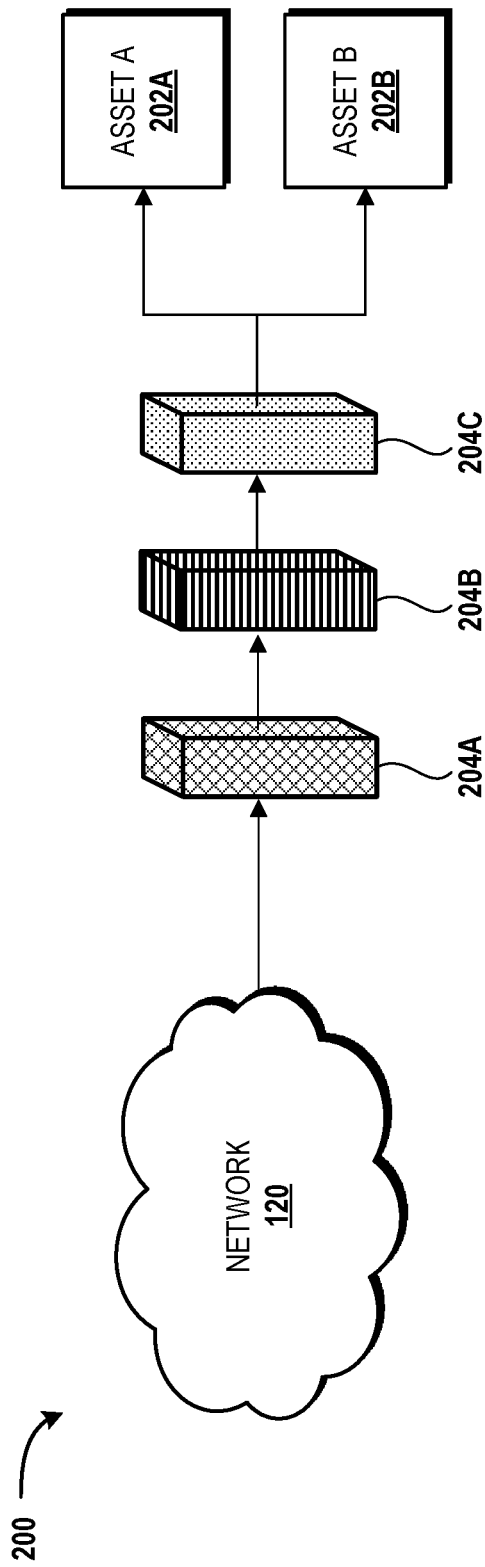
FIGS. 2A-2B are block diagrams illustrating various aspects of a ring-based security model in accordance with an illustrative embodiment and in comparison to a perimeter-based security model.
Figure 2B:
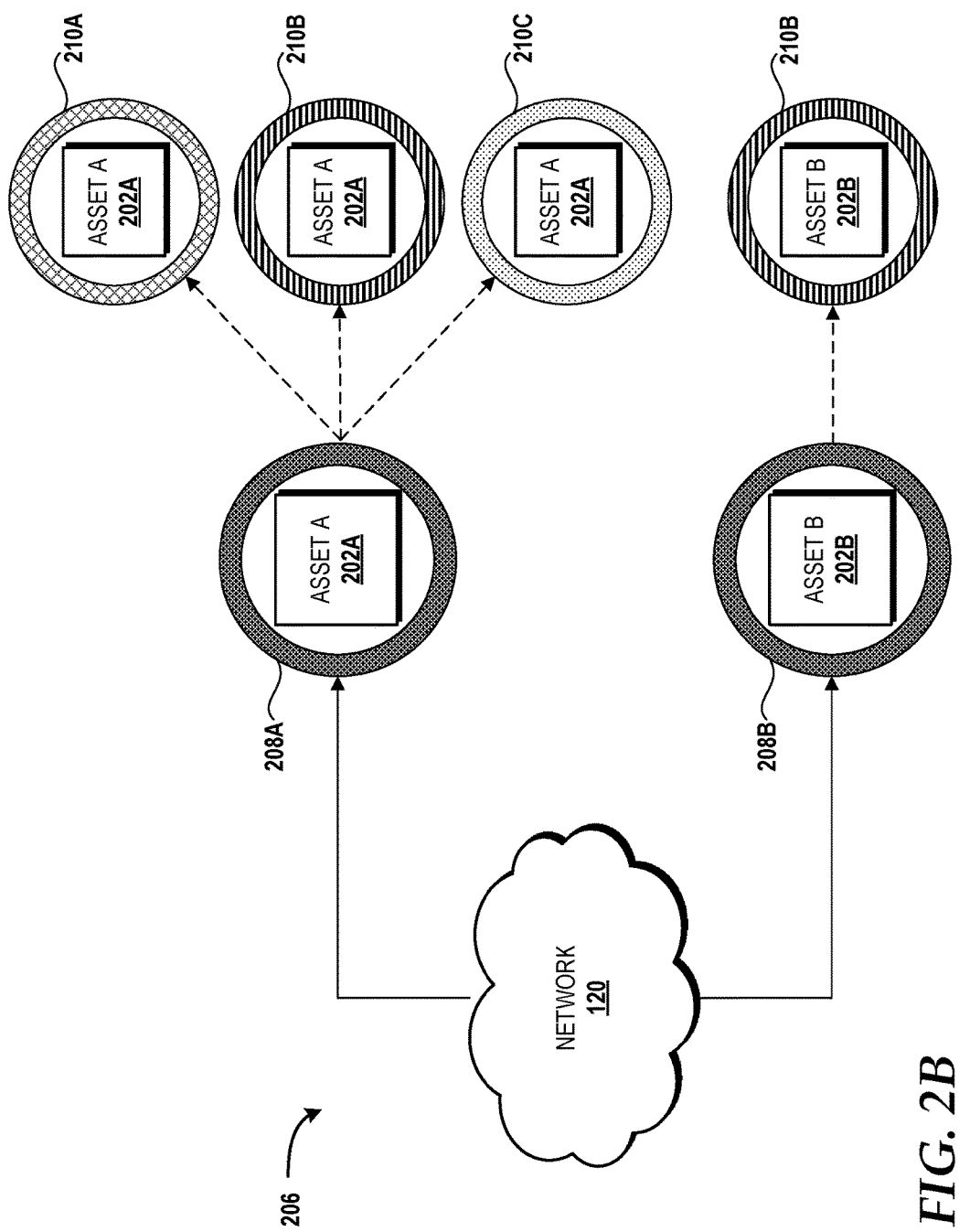

FIGS. 2A-2B illustrate aspects of a ring-based security model (see FIG. 2B) that will be described in accordance with an illustrative embodiment and in comparison to a perimeter-based security model (see FIG. 2A). Turning first to FIG. 2A, a perimeter-based security model network configuration 200 shows the network 120 with which two assets—asset A 202A and asset B 202B—are in communication. Although two assets are shown, any number of assets may be protected using the perimeter-based security model network configuration 200. Moreover, the assets 202A, 202B may be any data, device, computing system, or any component thereof that an entity would like to protect from unauthorized use, alteration, destruction, theft, illicit access, or any malicious activity.

The assets 202A, 202B in the perimeter-based security model network configuration 200 are protected by network security appliances 204A-204C, which may individually perform any network security function, such as, for example, firewall functions, IDS functions, IPS functions, or authentication functions. The network security appliances 204A-204C include a first network security appliance 204A, a second network security appliance 204B, and a third network security appliance 204C.

The perimeter-based security model network configuration 200 may provide the necessary protection for the asset 202 against certain security threats, but as these threats evolve, the ineffectiveness of the perimeter-based security model network configuration 200 is quickly exposed—that is, for example, the inflexibility to enable rapid deployment of new security appliances and to enable the hardware and/or software of the network security appliances 204A-204C to be updated or otherwise improved to adapt to these evolved security threats.

By decoupling the hardware and software within the network security appliances 204A-204C and moving the software components to the distributed computing environment 106 (shown in FIG. 1), security service providers can benefit from on-demand access to a variety of security services through open APIs. In this manner, each asset requiring protection can be protected in accordance with the specific security requirements of that asset, instead of the security requirements of the collection of the assets as a whole, as is the case with the perimeter-based security model network configuration 200 described above.

Turning now to FIG. 2B, a ring-based security model network configuration 206 is shown. The ring-based security model network configuration 206 shows the network 120 with which two assets—asset A 202A and asset B 202B—are in communication. Although two assets are shown, any number of assets may be protected using the ring-based security model network configuration 206. The assets 202A, 202B in the ring-based security model network configuration 206 are surrounded by security software service rings 208A, 208B, respectively (referred to generally or generically as "security software service rings 208"). Each of the security software service rings 208 provides security that is specific to one or more assets. In the illustrated example, the security software service ring 208A is associated with the security functions provided by a first network security ring 210A, a second network security ring 210B, and a third network security ring 210C to the asset A 202A. Also in the illustrated example, the security service ring 208B is associated with the security functions provided by the second network security ring 210B to the asset B 202B. It should be understood that the security software service rings 208 may be associated with any number of security functions provided by any number of network security rings, and so the illustrated example should not be construed as being limiting in any way.

In the illustrated example, the first network security ring 210A provides the same security function as the first network security appliance 204A; the second network security ring 210B provides the same security function as the second network security appliance 204B; the third network security ring 210C provides the same security function as the third network security appliance 204C; and, collectively, the network security rings 210A-210C provide customized protection for the asset A 202A. The second network security ring 210B also provides customized protection for the asset B 202B. In this manner, the asset A 202A and the asset B 202B are protected in accordance with their individual specific security requirements, instead of the security requirements of the collection of both assets, as is the case with the perimeter-based security model network configuration 200 described above, wherein the asset A 202A and the asset B 202B are both protected by the first network security appliance 204A, the second network security appliance 204B, and the third network security appliance 204C.

Turning briefly to FIG. 1, the security software service platform 108 provides the network security rings 210 in response to API calls, such as the API calls 118. For example, the customer platform A 114A may initiate the API call A 118A to the security software service platform 108, in response to which, the security software service platform 108 can provision the security service provided by the network security software A 104A by configuring at least a portion of the computing resources 109 for executing the network security software A 104A to protect the asset A 202A and/or the asset B 202B. The asset A 202A and/or the asset B 202B may be virtualized assets deployed within the distributed computing environment 106 or may be assets external to the distributed computing environment 106 and operating on or within one or more of the customer platforms 114.

Figure 3:
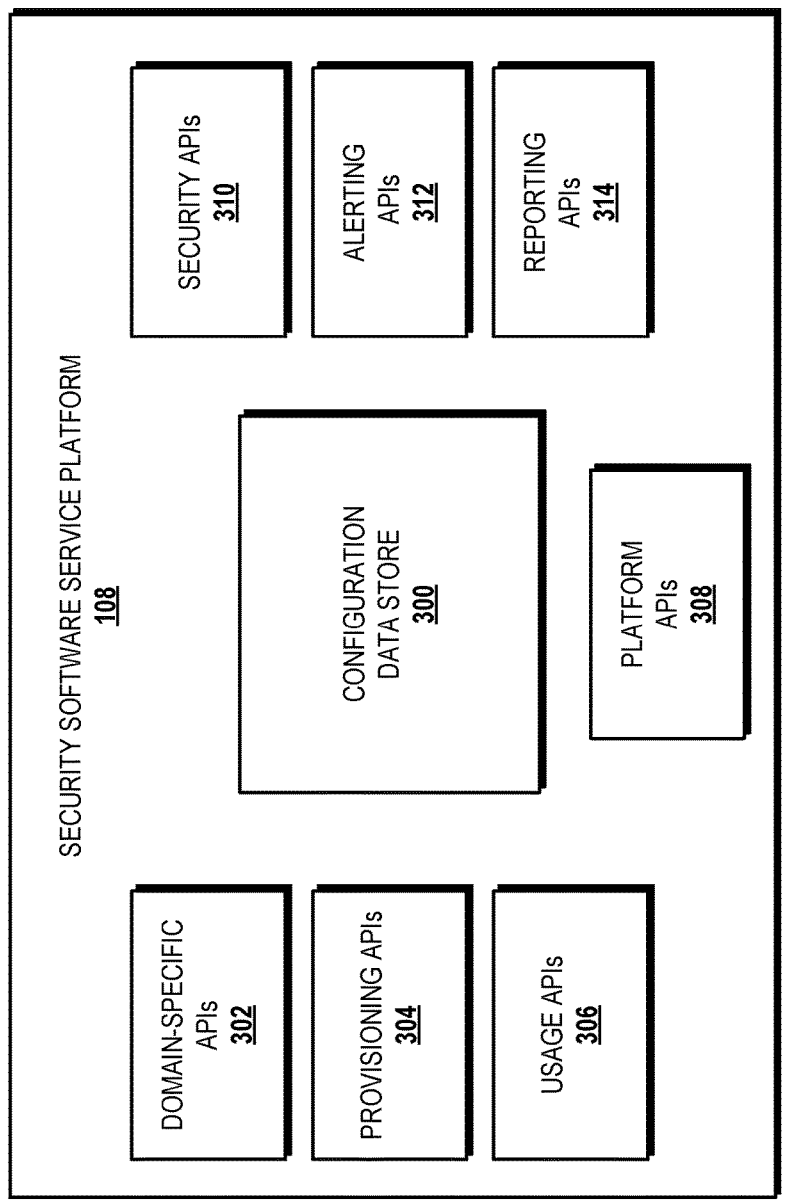
FIG. 3 is a block diagram illustrating a security software service platform and various components thereof, according to an illustrative embodiment.

Turning now to FIG. 3, the security software service platform 108 and various components thereof will be described in accordance with an illustrative embodiment. The illustrated security software service platform 108 includes a configuration data store 300, domain-specific APIs 302, provisioning APIs 304, usage APIs 306, platform APIs 308, security APIs 310, alerting APIs 312, and reporting APIs. 314. The various APIs 302-314 may include computer-executable instructions which, when executed by one or more processor internal or external to the distributed computing environment 106 cause the one or more processor to perform operations to facilitate interactions between the security software service platform 108 and one or more of the customer platforms 114.

The configuration data store 300 stores configuration data for implementing various security services within the distributed computing environment 106. For example, a particular security service provided by the network security software A 104A may require a certain configuration of at least a portion of the computing resources 109, and so the configuration data store 300 can store configuration data associated with this configuration such that API calls to the security software service platform 108 for the security service provided by the network security software A 104A may be responded to by configuring at least a portion of the computing resources 109 in accordance with the configuration data. In this way, customers can easily select security services to be provisioned for their assets without knowledge of the computing resources needed to actually implement the security services.

The domain-specific APIs 302 are exposed by the security software service platform 108 to allow certain domains names to access the security software service platform 108. Through the domain specific APIs 302, the security software service platform 108 can provide access to customer security services that are custom designed by one or more security service providers for a particular domain.

The provisioning APIs 304 are exposed by the security software service platform 108 to provision customers to utilize the security software service platform 108. The provisioning APIs 304 may access various customer systems, including customer databases, billing systems, charging systems, and other customer-oriented computing systems to provision a customer to utilize the security software service platform 108.

The usage APIs 306 are exposed by the security software service platform 108 to enable usage monitoring. Usage monitoring may include allowing customers to monitor resource usage of the computing resources 109 utilized by the security service(s) that is protecting their asset(s). Other usage monitoring may include monitoring data associated with the security service(s) that is protecting a customer's asset(s).

The platform APIs 308 are exposed by the security software service platform 108 to other applications, such as the applications 116 executing on the customer platforms 114 to allow access to the various security services offered via the security software service platform 108. The platform APIs 308 may be or may include the security software service APIs 112.

The security APIs 310 may include the network security software APIs 110 exposed by the network security software 104 deployed within the distributed computing environment 106.

The alerting APIs 312 are exposed by the security software service platform 108 to enable internal or external alerts to be generated and sent to customers. Internal alerts may be provided within the security software service platform 108 to alert of issues the computing resources 109 and/or the network security software 104 executing on the computing resources 109. External alerts may be provided to the customer platforms 114 in response to alert criteria being met. It is contemplated that the alert criteria may include pre-defined alert criteria which may be implemented by default or upon selection by a customer when a security service is provisioned. It also is contemplated that the alert criteria may include custom alert criteria defined by or for a customer when a security service is provisioned. Alert may be sent via email, telephone call, push notification, short message service ("SMS") message, Internet protocol ("IP") message, really simple syndication ("RSS") feed, or other alert methodology known in the art.

The reporting APIs 314 are exposed by the security software service platform 108 to enable reports to be generated and sent to customers. The reports may provide summary-level and/or detailed accounts of any operations performed by the security software service platform 108 or at the control of the security software service platform 108, including operations performed by the network security software 104. The reports may be provided via email, telephone call, push notification, SMS message, IP message, RSS feed, or any other reporting methodology known in the art.

Figure 4:
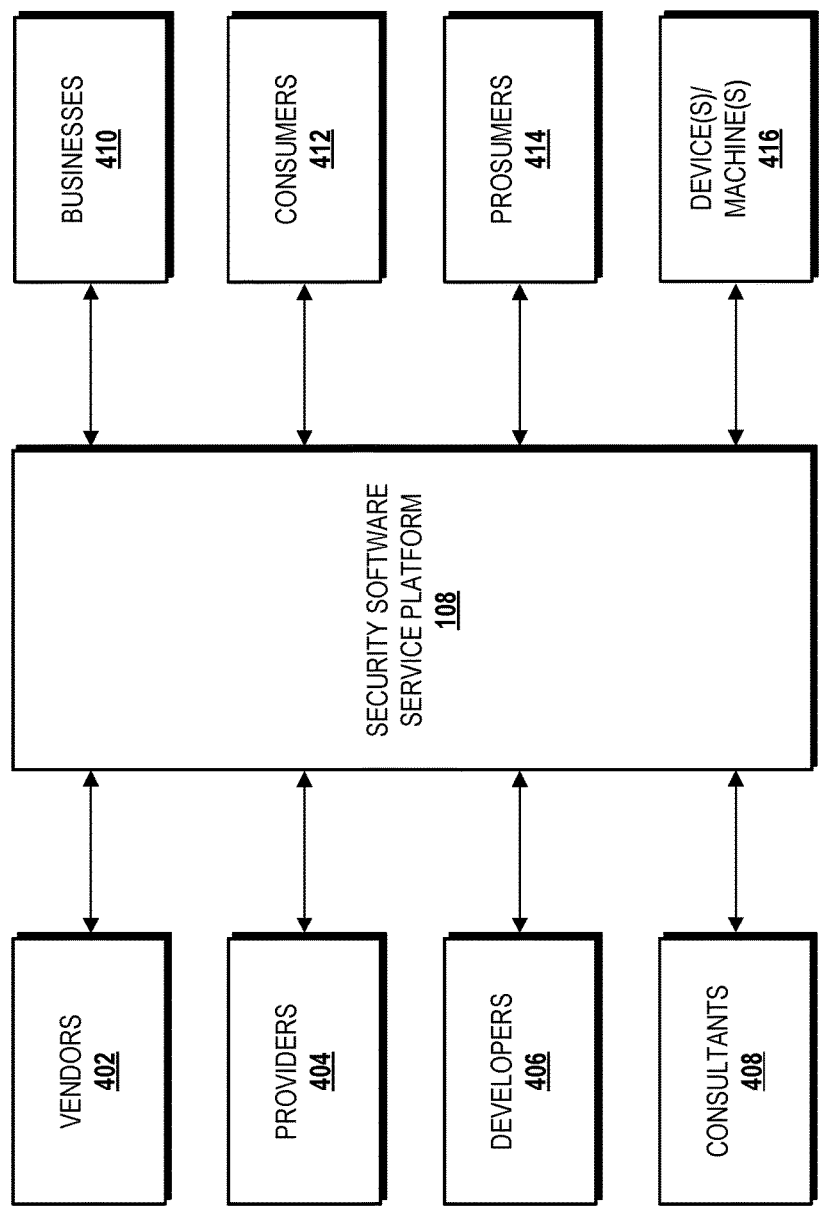
FIG. 4 is a block diagram illustrating a concept of platform multipliers in context of a security software service platform, according to an illustrative embodiment.

Turning now to FIG. 4, a concept of platform multipliers will be described in context of the security software service platform 108. The security software service platform 108 is able to generate revenue via multiple avenues. As illustrated in FIG. 4, the security software service platform 108 is in communication with vendors 402, providers 404, developers 406, and consultants 408 on the left-hand side, and on the right-hand side, the security software service platform 108 is in communication with businesses 410, consumers 412, prosumers 414, and devices/machines 416.

The vendors 402, the providers 404, the developers 406, and the consultants 408 are able to decouple the hardware and software components of their network security device offerings and deploy them within the distributed computing environment 106 at the control of the security software service platform 108. The entity that operates the security software service platform 108 may charge a fee to the vendors 402, the providers 404, the developers 406, and/or the consultants 408 for use of the security software service platform 108 as a way by which to offer security services in addition to or in lieu of dedicated network security devices. Additionally, the security software service platform 108 provides the security services to a plurality of customer types, such as, for example, the businesses 410, the consumers 412, the prosumers 414, and the devices/machines 416.

Moreover, the vendors 402, the providers 404, the developers 406, and/or the consultants 408 may access a number of security services offered by each other. A fee may be associated with such offerings, and so this provides yet another avenue for revenue generated by the security software service platform 108.

Figure 5:
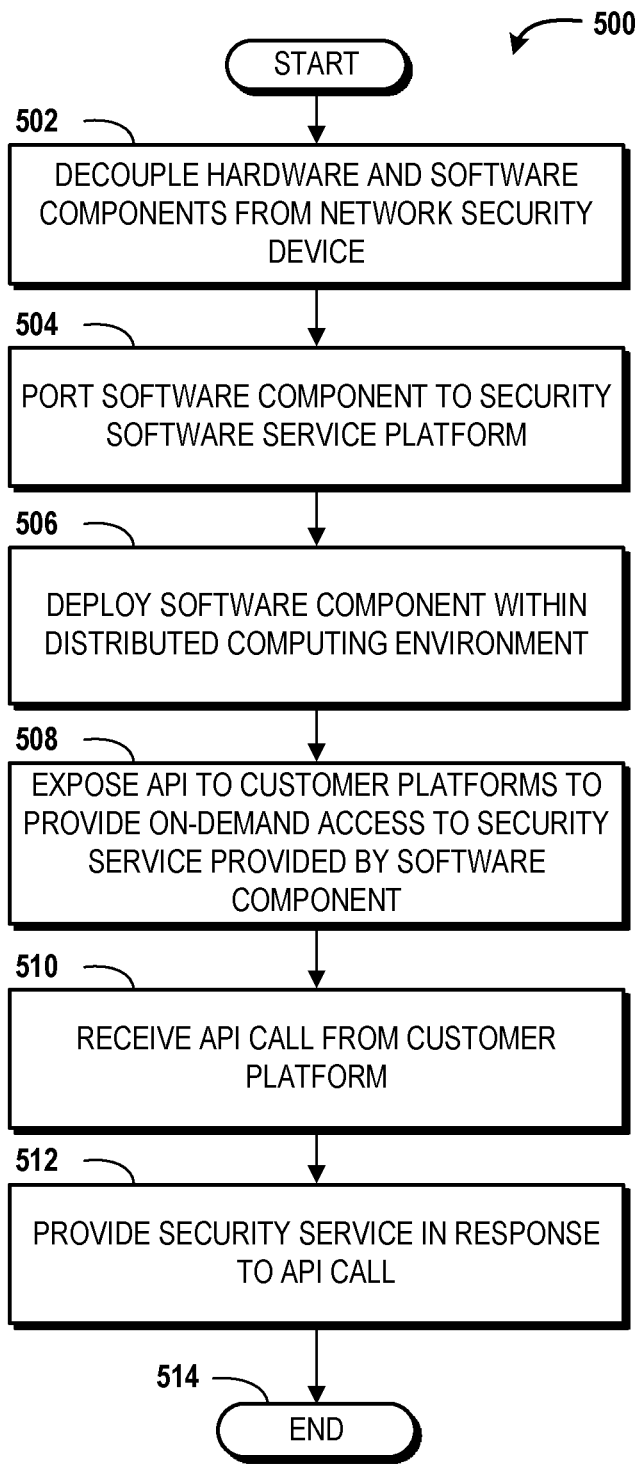
FIG. 5 is a flow diagram showing aspects of a method for decoupling hardware and software components of network security devices to provide security software as a service in a distributed computing environment, according to an illustrative embodiment.

Turning now to FIG. 5, aspects of a method 500 for decoupling hardware and software components of the network security devices 102 to provide security software as a service in the distributed computing environment 106 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, any computing resources operating within the distributed computing environment 106 or external to the distributed computing environment 106 to perform one or more operations and/or causing the processor to direct other components of the computing system or device to perform one or more of the operations.

For purposes of illustrating and describing some of the concepts of the present disclosure, the method 500 is described as being performed in part by one or more service providers and in another part by the security software service platform 108 via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 500 begins at operation 502, wherein a security service provider of a network security device, such as one of the network security devices 102, decouples the software components from the hardware components of the network security device, such as by decoupling the network security software 104A from the network security device A 102A, the network security software 104B from the network security device B 102B, or the network security software 104N from the security device N 102N. The process of decoupling the software components from the hardware components of the network security device may be particular to a specific security service provider, and therefore the details of the actual decoupling process are not detailed herein.

From operation 502, the method 500 proceeds to operation 504, wherein the security service provider ports the software component of the network security device to the security software service platform 108. The process of porting the software component to the security software service platform 108 may be facilitated by a porting software application, which may be implemented via one or more web or native applications. In some implementations, the security service provider creates an account with the security software service platform 108 and uploads the software component(s) to the security software service platform 108 in association with that account.

From operation 504, the method 500 proceeds to operation 506, wherein the security software service platform 108 deploys the software component within the distributed computing environment 106. From operation 506, the method 500 proceeds to operation 508, wherein the security software service platform 108 exposes an API, such as the security software service API 112 to the customer platforms 114 to provide on-demand access to the security service provided by the software component that was decoupled from the hardware of the network security device.

From operation 508, the method 500 proceeds to operation 510, wherein the security software service platform 108 receives an API call from a customer platform, such as one of the API calls 118 from one of the customer platforms 114. In response to the API call, the security software service platform 108 provides the security service requested in the API call. From operation 512, the method 500 proceeds to operation 514. The method 500 ends at operation 514.

Figure 6:
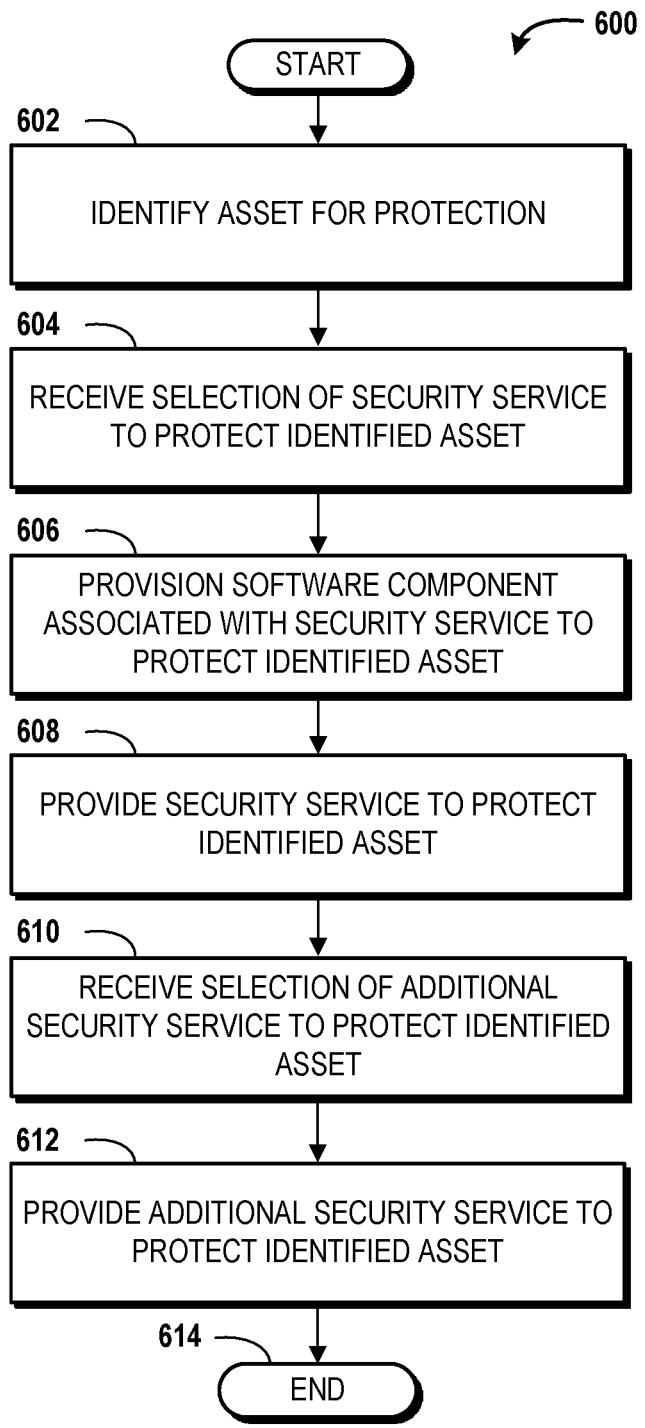
FIG. 6 is a flow diagram showing aspects of a method for establishing security rings around an asset, according to another illustrative embodiment.

Turning now to FIG. 6, aspects of a method 600 for establishing security rings around an asset will be described in detail, according to an illustrative embodiment. For purposes of illustrating and describing some of the concepts of the present disclosure, the method 600 is described as being performed by the security software service platform 108 via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 600 begins at operation 602, wherein the security software service platform 108 identifies an asset for protection. In some embodiments, the asset is identified via input received from a customer platform, such as one of the customer platforms 114. A user of the customer platform may identify the asset for protection by way of a web application interface or a native application interface. The identified asset may be a virtualized asset that has been deployed within the distributed computing environment 106. In some embodiments, the virtualized asset is not yet deployed within the distributed computing environment 106. In some other embodiments, the asset is virtualized in another distributed computing environment. In still other embodiments, the asset is not virtualized.

From operation 602, the method 600 proceeds to operation 604, wherein the security software service platform 108 receives a selection of one or more security services to protect the identified asset. For example, a user of the customer platform may select a firewall service, an IDS service, and an authentication service for protecting the identified asset. In response to the selection, the security software service platform 108, at operation 606, provisions the software component(s) associated with the selected security service(s) to protect the identified asset.

From operation 606, the method 600 proceeds to operation 608, wherein the security software service platform 108 provides the security service(s) to protect the identified asset. The security software service platform 108 provides the security service(s) to protect the identified asset in accordance with a ring-based security model such as described herein above. In this manner, each asset requiring protection can be protected in accordance with the specific security requirements of that asset, instead of the security requirements of the collection of the assets as a whole, as is the case with a perimeter-based security model.

From operation 608, the method 600 proceeds to operation 610, wherein the security software service platform 108 receives a selection of one or more additional security services to protect the identified asset. The method 600 then proceeds to operation 612, wherein the security software service platform 108 provides the additional security service(s) to protect the identified asset. From operation 612, the method 600 proceeds to operation 614. The method 600 ends at operation 614.

Figure 7:
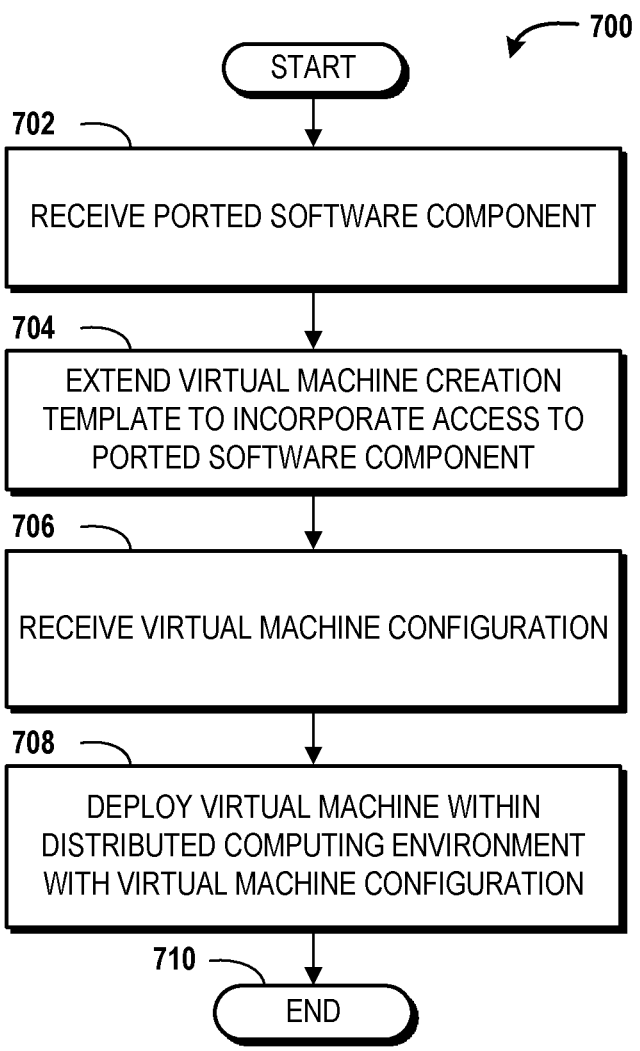
FIG. 7 is a flow diagram showing aspects of a method for extending a virtual machine creation template to incorporate a newly-ported software component that has been decoupled from a network security device, according to another illustrative embodiment.

Turning now to FIG. 7, aspects of a method 700 for extending a virtual machine creation template to incorporate a newly-ported software component that has been decoupled from a network security device will be described in detail, according to an illustrative embodiment. The method 700 begins at operation 702, wherein the security software service platform 108 receives a ported software component that has been decoupled from a network security device. For example, the security software service platform 108 may receive the network security software A 104A, the network security software B 104B, and/or the network security software N 104N that has been decoupled from the network security device A 102A, the network security device B 102B, and/or the network security device N 102N, respectively.

From operation 702, the method 700 proceeds to operation 704, wherein the security software service platform 108 extends a virtual machine creation template to incorporate access to the ported software component. For example, the template may include a user interface element, such as, for example, a checkbox, to allow a user to enable or disable the ported software component. If selected, the ported software component can be enabled for an identified asset From operation 704, the method 700 proceeds to operation 706, wherein the security software service platform 108 receives, from a customer platform, a virtual machine configuration that utilizes the extended virtual machine creation template. In response, at operation 708, the security software service platform 108 deploys a new virtual machine that is configured in accordance with the virtual machine configuration within the distributed computing environment 106. From operation 708, the method 700 proceeds to operation 710. The method 700 ends at operation 710.

Figure 8:
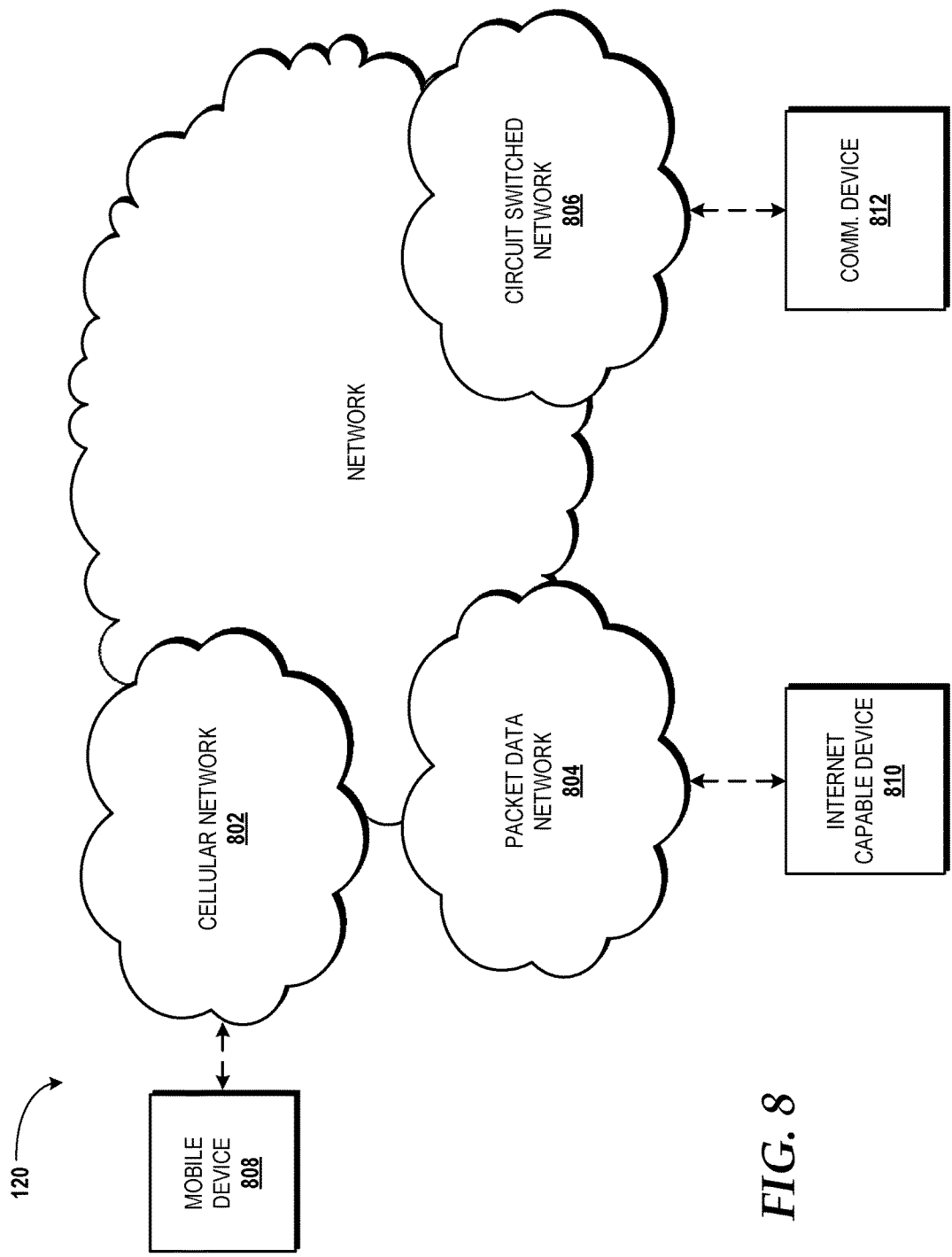
FIG. 8 schematically illustrates a network, according to an illustrative embodiment.

Turning now to FIG. 8, additional details of the network 120 are illustrated, according to an illustrative embodiment. The network 120 includes a cellular network 802, a packet data network 804, for example, the Internet, and a circuit switched network 806, for example, a publicly switched telephone network ("PSTN"). The cellular network 802 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 802 also includes radios and nodes for receiving and transmitting voice, data, and combinations thereof to and from radio transceivers, networks, the packet data network 804, and the circuit switched network 806.

A mobile communications device 808, such as, for example, a cellular telephone, a user equipment, a mobile terminal, a PDA, a laptop computer, a handheld computer, and combinations thereof, can be operatively connected to the cellular network 802. In some embodiments, the mobile communications device 808 is or is included in one or more of the customer platforms 114. The cellular network 802 can be configured as a 2G GSM network and can provide data communications via GPRS and/or EDGE. Additionally, or alternatively, the cellular network 802 can be configured as a 3G UMTS network and can provide data communications via the HSPA protocol family, for example, HSDPA, EUL (also referred to as HSDPA), and HSPA+. The cellular network 802 also is compatible with 4G mobile communications standards as well as evolved and future mobile standards.

The packet data network 804 includes various devices, for example, servers, computers, databases, and other devices in communication with one another, as is generally known. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet. The circuit switched network 806 includes various hardware and software for providing circuit switched communications. The circuit switched network 806 may include, or may be, what is often referred to as a plain old telephone system (POTS). The functionality of a circuit switched network 806 or other circuit-switched network are generally known and will not be described herein in detail.

The illustrated cellular network 802 is shown in communication with the packet data network 804 and a circuit switched network 806, though it should be appreciated that this is not necessarily the case. One or more Internet-capable devices 810, for example, a personal computer, a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, or the like, can be in communication with the circuit switched network 806, and there through to the packet data network 804 and/or the cellular network 802. It should be appreciated that the communications device 812 can be an Internet-capable device, and can be substantially similar to the Internet-capable device 810. In the specification, the network 120 is used to refer broadly to any combination of the networks 802, 804, 806. It should be appreciated that substantially all of the functionality described with reference to the network 120 can be performed by the cellular network 802, the packet data network 804, and/or the circuit switched network 806, alone or in combination with other networks, network elements, and the like.

According to various implementations, the customer platforms 114 can use any combination of the devices disclosed herein including, but not limited to, the mobile device 808, the Internet capable device 810, and/or the communication device 812 to access web pages or other resources, such as web pages or other resources provided by or for the security software service platform 108 and/or the distributed computing environment 106, to access the security software service platform 108, to access the distributed computing environment 106, to receive the API calls 118, to respond to the API calls 118, and/or for other interactions between the customer platforms 114 and the security software service platform 108 and the distributed computing environment 106. As such, it should be understood that the security software service platform 108, the distributed computing environment 106, and the customer platforms 114 can interact with one another via any number and/or combination of devices and networks.

Figure 9:
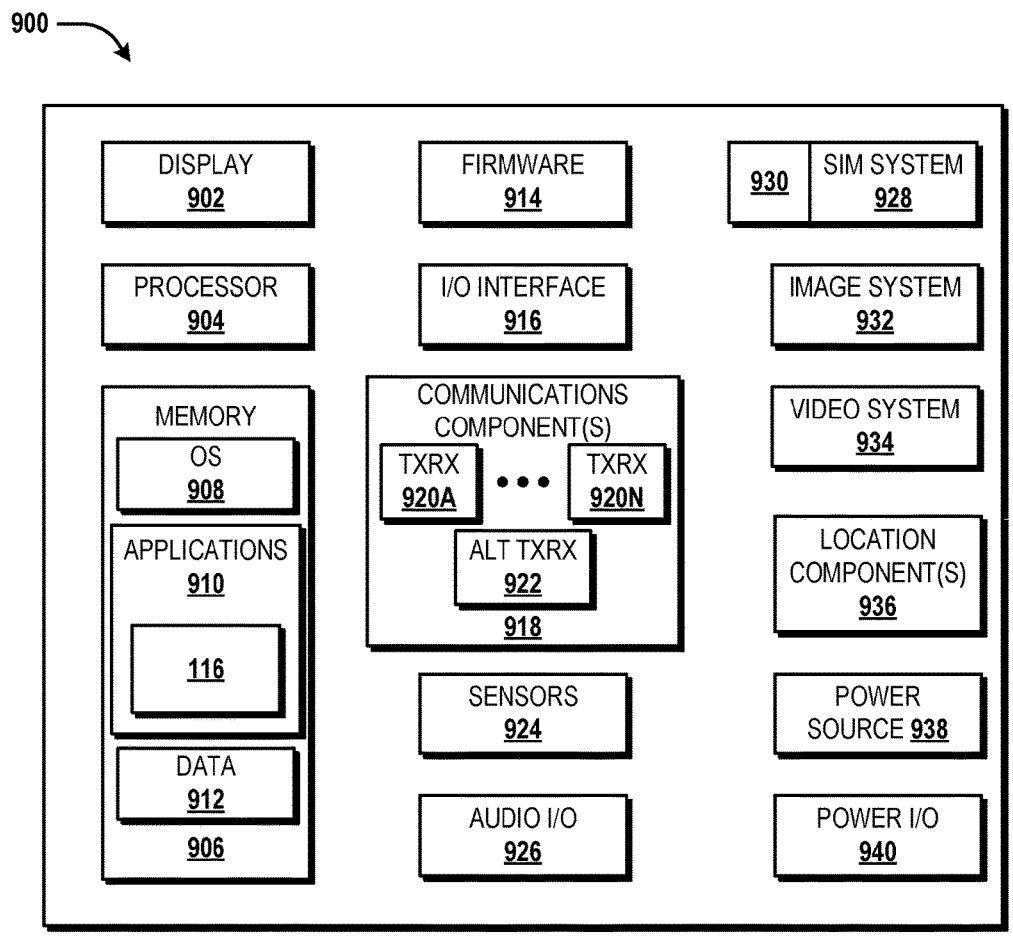
FIG. 9 is a block diagram illustrating an example mobile device configured to interact with a security software service platform, according to some illustrative embodiments.

Turning now to FIG. 9, an illustrative mobile device 900 and components thereof will be described. In some embodiments, one or more of the customer platforms 114 described above with reference to FIG. 1 can be configured as and/or can have an architecture similar or identical to the mobile device 900 described herein in FIG. 9. It should be understood, however, that the customer platforms 114 may or may not include the functionality described herein with reference to FIG. 9. While connections are not shown between the various components illustrated in FIG. 9, it should be understood that some, none, or all of the components illustrated in FIG. 9 can be configured to interact with one other to carry out various device functions. In some embodiments, the components are arranged so as to communicate via one or more busses (not shown). Thus, it should be understood that FIG. 9 and the following description are intended to provide a general understanding of a suitable environment in which various aspects of embodiments can be implemented, and should not be construed as being limiting in any way.

As illustrated in FIG. 9, the mobile device 900 can include a display 902 for displaying data. According to various embodiments, the display 902 can be configured to display asset information, asset tag or asset ID information, asset management account information, various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 900 also can include a processor 904 and a memory or other data storage device ("memory") 906. The processor 904 can be configured to process data and/or can execute computer-executable instructions stored in the memory 906. The computer-executable instructions executed by the processor 904 can include, for example, an operating system 908, one or more applications 910 such as one or more of the applications 116, other computer-executable instructions stored in the memory 906, or the like. In some embodiments, the applications 906 also can include a UI application (not illustrated in FIG. 9).

The applications 116 may include a mobile client that enables the mobile device 900 to make open API calls to the security software service platform 108 for seamless provisioning of security services provided through the security software service platform 108 on the mobile device 900. The mobile client, in some embodiments, is a lite weight client.

As explained above, the increased adoption by companies of a bring-your-own-device policy introduces some security concerns. For example, allowing an employee to bring his or her smartphone device to work and allowing that device to connect to their company's wireless local area network may introduce malicious software into the company's internal network, often unbeknownst to the employee. With tens, hundreds, or even thousands of devices interacting with a company's internal network on a daily basis, the number of possible security threats from each individual device, let alone any malicious software or rogue code operating within what is perceived to be legitimate software, is likely to increase significantly, and is therefore further reason to move away from the inflexible nature of the current perimeter-based security model. By loading the mobile client onto the mobile device 900, an enterprise can automate provisioning of the mobile device 900, other like devices, and services on these devices as well as enable traffic encryption and routing through a network based security node deployed within the distributed computing environment 106 and controlled by the security software service platform 108.

The UI application can interface with the operating system 908 to facilitate user interaction with functionality and/or data stored at the mobile device 900 and/or stored elsewhere. In some embodiments, the operating system 908 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 904 to aid a user in entering content, scanning or capturing asset ID or asset tag information, creating new asset tags or asset ID numbers, viewing asset information and/or account information, answering/initiating calls, entering/deleting data, entering and setting user IDs and passwords for device access, configuring settings, manipulating address book content and/or settings, multimode interaction, interacting with other applications 910, and otherwise facilitating user interaction with the operating system 908, the applications 910, and/or other types or instances of data 912 that can be stored at the mobile device 900. The data 912 can include, for example, asset information, asset tags and/or asset identifiers, and/or other applications or program modules. According to various embodiments, the data 912 can include, for example, presence applications, visual voice mail applications, messaging applications, text-to-speech and speech-totext applications, add-ons, plug-ins, email applications, music applications, video applications, camera applications, location-based service applications, power conservation applications, game applications, productivity applications, entertainment applications, enterprise applications, combinations thereof, and the like. The applications 910, the data 912, and/or portions thereof can be stored in the memory 906 and/or in a firmware 914, and can be executed by the processor 904. The firmware 914 also can store code for execution during device power up and power down operations. It can be appreciated that the firmware 914 can be stored in a volatile or non-volatile data storage device including, but not limited to, the memory 906 and/or a portion thereof.

The mobile device 900 also can include an input/output ("I/O") interface 916. The I/O interface 916 can be configured to support the input/output of data such as location information, asset information, user information, organization information, presence status information, user IDs, passwords, and application initiation (start-up) requests. In some embodiments, the I/O interface 916 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ411) port, an RJ11 port, a proprietary port, combinations thereof, or the like. In some embodiments, the mobile device 900 can be configured to synchronize with another device to transfer content to and/or from the mobile device 900. In some embodiments, the mobile device 900 can be configured to receive updates to one or more of the applications 910 via the I/O interface 916, though this is not necessarily the case. In some embodiments, the I/O interface 916 accepts I/O devices such as keyboards, keypads, mice, interface tethers, printers, plotters, external storage, touch/multi-touch screens, touch pads, trackball s, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 916 may be used for communications between the mobile device 900 and a network device or local device.

The mobile device 900 also can include a communications component 918. The communications component 918 can be configured to interface with the processor 904 to facilitate wired and/or wireless communications with one or more networks such as the network 120 described herein. In some embodiments, other networks include networks that utilize non-cellular wireless technologies such as WI-FI or WIMAX. In some embodiments, the communications component 918 includes a multimode communications subsystem for facilitating communications via the cellular network and one or more other networks.

The communications component 918, in some embodiments, includes one or more transceivers. The one or more transceivers, if included, can be configured to communicate over the same and/or different wireless technology standards with respect to one another. For example, in some embodiments one or more of the transceivers of the communications component 918 may be configured to communicate using GSM, CDMAONE, CDMA2000, LTE, and various other 2G, 2.5G, 3G, 4G, and greater generation technology standards. Moreover, the communications component 918 may facilitate communications over various channel access methods (which may or may not be used by the aforementioned standards) including, but not limited to, TDMA, FDMA, W-CDMA, OFDM, SDMA, and the like.

In addition, the communications component 918 may facilitate data communications using GPRS, EDGE, the HSPA protocol family including HSDPA, EUL or otherwise termed HSUPA, HSPA+, and various other current and future wireless data access standards. In the illustrated embodiment, the communications component 918 can include a first transceiver ("TxRx") 920A that can operate in a first communications mode (e.g., GSM). The communications component 918 also can include an $N^{th}$ transceiver ("TxRx") 920N that can operate in a second communications mode relative to the first transceiver 920A (e.g., UMTS). While two transceivers 920A-N (hereinafter collectively and/or generically referred to as "transceivers 920") are shown in FIG. 9, it should be appreciated that less than two, two, and/or more than two transceivers 920 can be included in the communications component 918.

The communications component 918 also can include an alternative transceiver ("Alt TxRx") 922 for supporting other types and/or standards of communications. According to various contemplated embodiments, the alternative transceiver 922 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 918 also can facilitate reception from terrestrial radio networks, digital satellite radio networks, internet-based radio service networks, combinations thereof, and the like. The communications component 918 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 900 also can include one or more sensors 924. The sensors 924 can include temperature sensors, light sensors, air quality sensors, movement sensors, orientation sensors, noise sensors, proximity sensors, or the like. As such, it should be understood that the sensors 924 can include, but are not limited to, accelerometers, magnetometers, gyroscopes, infrared sensors, noise sensors, microphones, combinations thereof, or the like. Additionally, audio capabilities for the mobile device 900 may be provided by an audio I/O component 926. The audio I/O component 926 of the mobile device 900 can include one or more speakers for the output of audio signals, one or more microphones for the collection and/or input of audio signals, and/or other audio input and/or output devices.

The illustrated mobile device 900 also can include a subscriber identity module ("SIM") system 928. The SIM system 928 can include a universal SIM ("USIM"), a universal integrated circuit card ("UICC") and/or other identity devices. The SIM system 928 can include and/or can be connected to or inserted into an interface such as a slot interface 930. In some embodiments, the slot interface 930 can be configured to accept insertion of other identity cards or modules for accessing various types of networks. Additionally, or alternatively, the slot interface 930 can be configured to accept multiple subscriber identity cards. Because other devices and/or modules for identifying users and/or the mobile device 900 are contemplated, it should be understood that these embodiments are illustrative, and should not be construed as being limiting in any way.

The mobile device 900 also can include an image capture and processing system 932 ("image system"). The image system 932 can be configured to capture or otherwise obtain photos, videos, and/or other visual information. As such, the image system 932 can include cameras, lenses, charge-coupled devices ("CCDs"), combinations thereof, or the like. The mobile device 900 may also include a video system 934. The video system 934 can be configured to capture, process, record, modify, and/or store video content. Photos and videos obtained using the image system 932 and the video system 934, respectively, may be added as message content to an MMS message, email message, and sent to another mobile device. The video and/or photo content also can be shared with other devices via various types of data transfers via wired and/or wireless communication devices as described herein.

The mobile device 900 also can include one or more location components 936. The location components 936 can be configured to send and/or receive signals to determine a geographic location of the mobile device 900. According to various embodiments, the location components 936 can send and/or receive signals from global positioning system ("GPS") devices, assisted-GPS ("A-GPS") devices, WI-FI/WIMAX and/or cellular network triangulation data, combinations thereof, and the like. The location component 936 also can be configured to communicate with the communications component 918 to retrieve triangulation data for determining a location of the mobile device 900. In some embodiments, the location component 936 can interface with cellular network nodes, telephone lines, satellites, location transmitters and/or beacons, wireless network transmitters and receivers, combinations thereof, and the like. In some embodiments, the location component 936 can include and/or can communicate with one or more of the sensors 924 such as a compass, an accelerometer, and/or a gyroscope to determine the orientation of the mobile device 900. Using the location component 936, the mobile device 900 can generate and/or receive data to identify its geographic location, or to transmit data used by other devices to determine the location of the mobile device 900. The location component 936 may include multiple components for determining the location and/or orientation of the mobile device 900.

The illustrated mobile device 900 also can include a power source 938. The power source 938 can include one or more batteries, power supplies, power cells, and/or other power subsystems including alternating current ("AC") and/or direct current ("DC") power devices. The power source 938 also can interface with an external power system or charging equipment via a power I/O component 940. Because the mobile device 900 can include additional and/or alternative components, the above embodiment should be understood as being illustrative of one possible operating environment for various embodiments of the concepts and technologies described herein. The described embodiment of the mobile device 900 is illustrative, and should not be construed as being limiting in any way.

Figure 10:
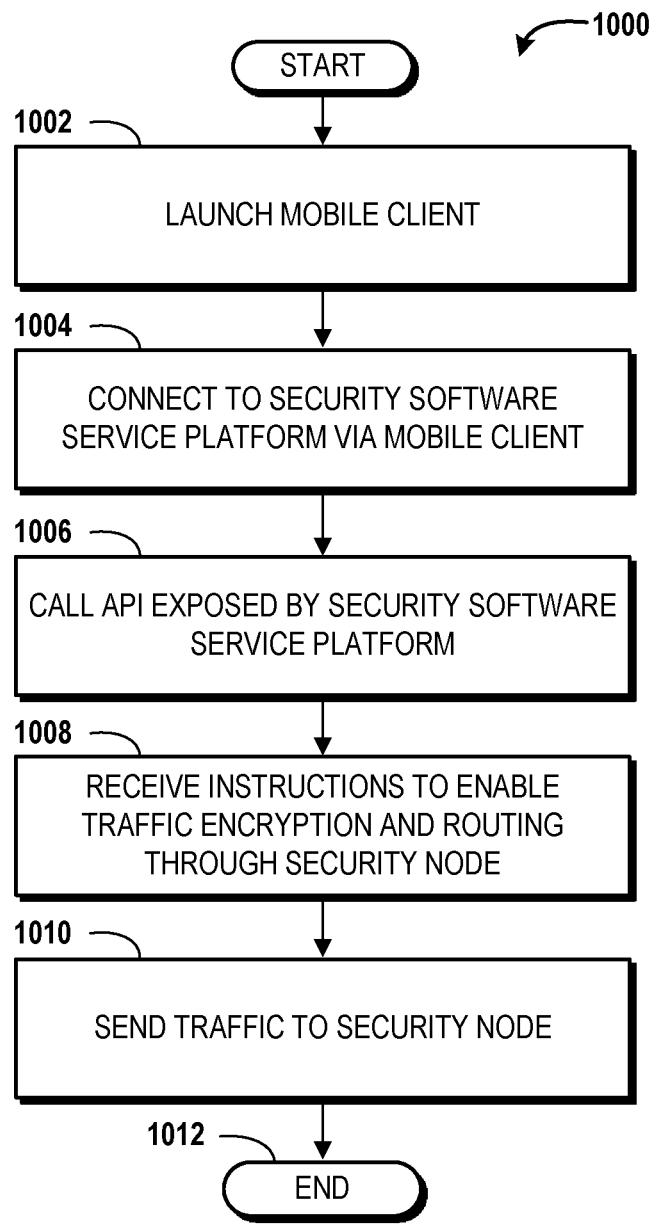
FIG. 10 is a flow diagram showing aspects of a method for enabling a mobile device to make open API calls to the security software service platform, according to an illustrative embodiment.

Referring now to FIG. 10, a method 1000 for enabling a mobile device to make open API calls to the security software service platform 108 will be described, according to an illustrative embodiment. The method 1000 is described as being performed by one of the customer platforms 114 that is configured as a mobile device, such as, for example, the mobile device 900.

The method 1000 begins at operation 1002, wherein the customer platform 114 launches a mobile client. From operation 1002, the method 1000 proceeds to operation 1004, wherein the customer platform 114 connects to the security software service platform via the mobile client. From operation 1004, the method 1000 proceeds to operation 1006, wherein the mobile client calls an API exposed by the security software service platform 108 to enable provisioning of the customer platform 114 as well as network based security features to enforce one or more policies on the customer platform 114, wherein the customer platform 114 is utilized as a bring-your-own-device device.

From operation 1006, the method 1000 proceeds to operation 1008, wherein the customer platform 114 receives instructions to enable traffic encryption for traffic originating from and terminating at the customer platform 114. In addition, the customer platform 114 receives instructions for routing traffic originating from the customer platform 114 to a security node operating within the distributed computing environment 106 at the control of the security software service platform 108, wherein the security node is operated as part of a security service provided by one or more security service providers.

From operation 1008, the method 1000 proceeds to operation 1010, wherein the customer platform 114 sends traffic to the security node operating within the distributed computing environment 106 at the control of the security software service platform 108. From operation 1010, the method 100 proceeds to operation 1012. The method ends at operation 1012.

Figure 11:
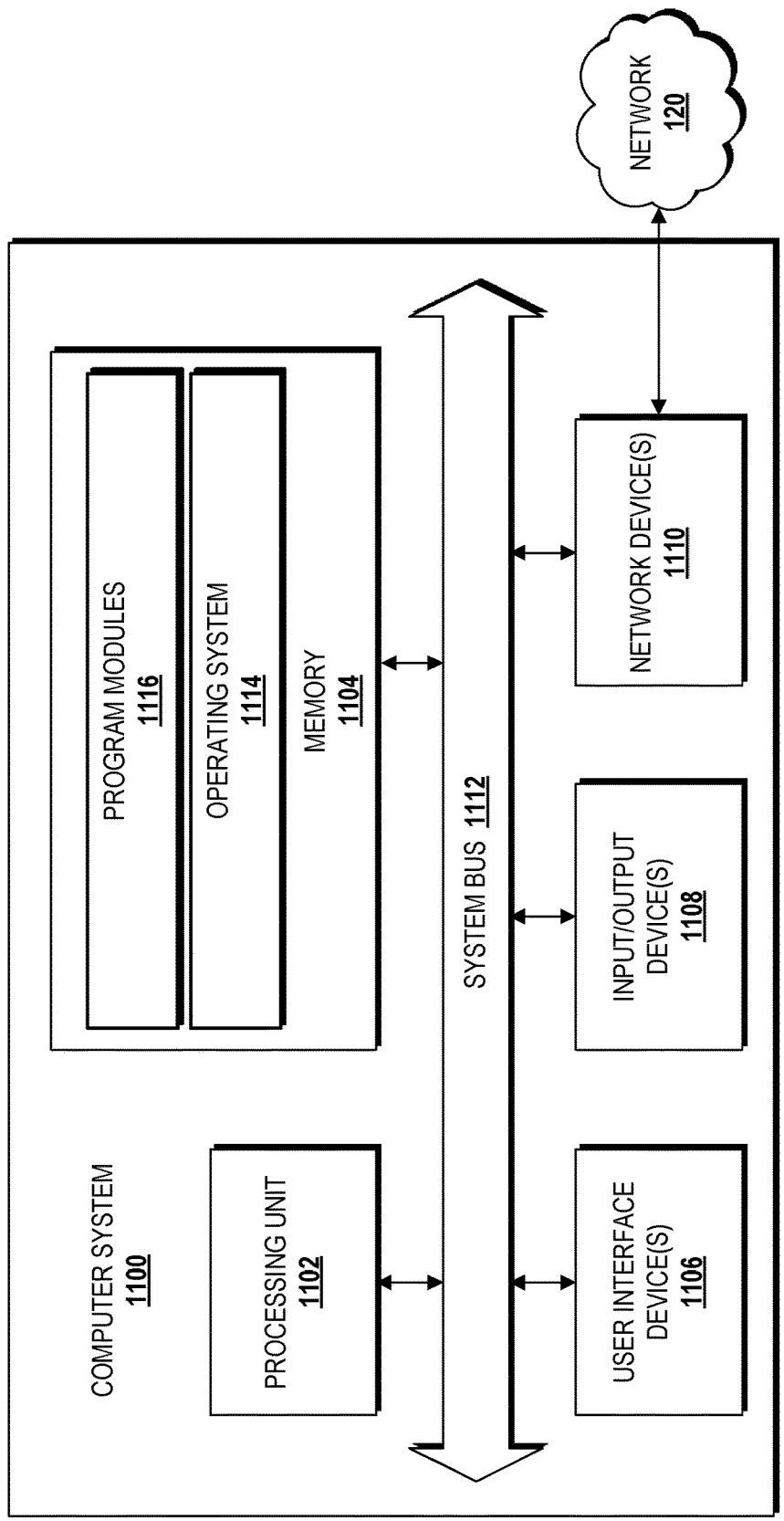
FIG. 11 is a block diagram illustrating an example computer system configured to provide security software as a service in a distributed computing environment, according to some illustrative embodiments.

FIG. 11 is a block diagram illustrating a computer system 1100 configured to provide the functionality described herein for providing security software as a service in a distributed computing environment utilizing software components decoupled from hardware components of network security devices, in accordance with various embodiments of the concepts and technologies disclosed herein. In some embodiments, one or more of the customer platforms 114 described above with reference to FIG. 1 can be configured as and/or can have an architecture similar or identical to the computer system 1100 described herein in FIG. 11. It should be understood, however, that the customer platforms 114 may or may not include the functionality described herein with reference to FIG. 10. The computer system 1100 may also be used as an example of at least a portion of the computing resources 109 made available via the distributed computing environment 106. For example, the security software service platform 108 may execute on at least a portion of the computing resources 109 embodied as at least one computer system configured at least partially in accordance with the computer system 1100. It should be understood, however, that the security software platform 108 may execute on other single and multi-processor systems to provide the functionality described herein.

The computer system 1100 includes a processing unit 1102, a memory 1104, one or more user interface devices 1106, one or more input/output ("I/O") devices 1108, and one or more network devices 1110, each of which is operatively connected to a system bus 1112. The bus 1112 enables bi-directional communication between the processing unit 1102, the memory 1104, the user interface devices 1106, the I/O devices 1108, and the network devices 1110.

The processing unit 1102 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 1104 communicates with the processing unit 1102 via the system bus 1112. In some embodiments, the memory 1104 is operatively connected to a memory controller (not shown) that enables communication with the processing unit 1102 via the system bus 1112. The memory 1104 includes an operating system 1114 and one or more program modules 1116. The operating system 1114 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 1116 may include various software and/or program modules described herein. In some embodiments, for example, the program modules 1116 include program modules for operating the security software service platform 108 or any of the computing resources of the distributed computing environment 106. This and/or other programs can be embodied in computer-readable media containing instructions that, when executed by the processing unit 1102, perform one or more of the methods 500, 600, 700 described in detail above with respect to FIGS. 5-7. According to embodiments, the program modules 1116 may be embodied in hardware, software, firmware, or any combination thereof. Although not shown in FIG. 11, it should be understood that the memory 1104 also can be configured to store the various data, such as the configuration data described in FIG. 3 as being stored in the configuration data store 300, if desired.

By way of example, and not limitation, computer-readable media may include any available computer storage media or communication media that can be accessed by the computer system 1100. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1100. In the claims, the phrase "computer storage medium" and variations thereof does not include waves or signals per se and/or communication media.

The user interface devices 1106 may include one or more devices with which a user accesses the computer system 1100. The user interface devices 1106 may include, but are not limited to, computers, servers, personal digital assistants, cellular phones, or any suitable computing devices. The I/O devices 1108 enable a user to interface with the program modules 1116. In one embodiment, the I/O devices 1108 are operatively connected to an I/O controller (not shown) that enables communication with the processing unit 1102 via the system bus 1112. The I/O devices 1108 may include one or more input devices, such as, but not limited to, a keyboard, a mouse, or an electronic stylus. Further, the I/O devices 1108 may include one or more output devices, such as, but not limited to, a display screen or a printer.

The network devices 1110 enable the computer system 1100 to communicate with other networks or remote systems via a network, such as the network 104. Examples of the network devices 1110 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for decoupling hardware and software components of network security devices to provide security software as a service in a distributed computing environment have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
  receiving, by a security software service platform executing on a first portion of a plurality of computing resources provided by a distributed computing system, a plurality of network security software components that have been decoupled from hardware components of a plurality of network security devices, wherein the plurality of network security software components provide, at least in part, a plurality of security services capable of protecting a plurality of assets associated with a customer platform;
  extending, by the security software service platform, a virtual machine creation template to incorporate access to the plurality of network security software components;

receiving, by the security software service platform, a virtual machine configuration from the customer platform, wherein the virtual machine configuration specifies
- a first asset associated with the customer platform and having a first set of security requirements,
- a second asset associated with the customer platform and having a second set of security requirements,
- a first security service of the plurality of security services to protect the first asset in accordance with the first set of security requirements, and
- a second security service of the plurality of security services to protect the second asset in accordance with the second set of security requirements; and deploying, by the security software service platform, a virtual machine on a second portion of the plurality of computing resources provided by the distributed computing system, wherein the virtual machine is configured in accordance with the virtual machine configuration to provide the first security service of the plurality of security services for the first asset associated with the customer platform and to provide the second security service of the plurality of security services for the second asset associated with the customer platform.

2. The method of claim 1, further comprising presenting a user interface element of the virtual machine creation template to the customer platform, wherein the user interface element allows a user of the customer platform to provide the virtual machine configuration.

3. The method of claim 1, wherein the customer platform comprises a plurality of mobile devices, and wherein each of the first and second asset comprises a mobile device of the plurality of mobile devices.

4. The method of claim 1, wherein the asset is a virtualized asset operating within the distributed computing system.

5. The method of claim 1, further comprising:
provisioning the first security service to protect the first asset and the second security service to protect the second asset; and
providing the first security service to protect the first asset and the second security service to protect the second asset.

6. The method of claim 1, further comprising exposing, by the security software service platform, an application programming interface through which the customer platform provides the virtual machine configuration.

7. The method of claim 6, further comprising:
calling a first application programming interface associated with a first network security software component of the plurality of network security software components to provide the first security service of the plurality of security services for the first asset; and
calling a second application programming interface associated with a second network security software component of the plurality of network security software components to provide the second security service of the plurality of security services for the second asset.

8. A distributed computing system comprising:
a plurality of computing resources; and
a security software service platform comprising instructions that, when executed by a first portion of the plurality of computing resources, performs operations comprising
receiving a plurality of network security software components that have been decoupled from hardware components of a plurality of network security devices, wherein the plurality of network security software components provide, at least in part, a plurality of security services capable of protecting a plurality of assets associated with a customer platform, extending a virtual machine creation template to incorporate access to the plurality of network security software components, receiving a virtual machine configuration from the customer platform, wherein the virtual machine configuration specifies
- a first asset associated with the customer platform and having a first set of security requirements,
- a second asset associated with the customer platform and having a second set of security requirements,
- a first security service of the plurality of security services to protect the first asset in accordance with the first set of security requirements, and
- a second security service of the plurality of security services to protect the second asset in accordance with the second set of security requirements, and deploying a virtual machine on a second portion of the plurality of computing resources, wherein the virtual machine is configured in accordance with the virtual machine configuration to provide the first security service of the plurality of security services for the first asset associated with the customer platform and to provide the second security service of the plurality of security services for the second asset associated with the customer platform.

9. The distributed computing system of claim 8, wherein the operations further comprise presenting a user interface element of the virtual machine template to the customer platform, wherein the user interface element allows a user of the customer platform provide the virtual machine configuration.

10. The distributed computing system of claim 8, wherein the customer platform comprises a plurality of mobile devices, and wherein each of the first and second asset comprises a mobile device of the plurality of mobile devices.

11. The distributed computing system of claim 8, wherein the asset is a virtualized asset operating within the distributed computing system.

12. The distributed computing system of claim 8, wherein the operations further comprise:
provisioning the first security service to protect the first asset and the second security service to protect the second asset; and
providing the first security service to protect the first asset and the second security service to protect the second asset.

13. The distributed computing system of claim 8, wherein the operations further comprise exposing an application programming interface through which the customer platform provides the virtual machine configuration.

14. The distributed computing system of claim 13, wherein the operations further comprise:
calling a first application programming interface associated with a first network security software component of the plurality of network security software components to provide the first security service of the plurality of security services for the first asset; and
calling a second application programming interface associated with a second network security software component of the plurality of network security software components to provide the second security service of the plurality of security services for the second asset.

15. A computer-readable storage medium comprising instructions that, when executed by at least a portion of a plurality of computing resources of a distributed computing system, cause the portion of the plurality of computing resources of the distributed computing system to perform operations comprising:
receiving a plurality of network security software components that have been decoupled from hardware components of a plurality of network security devices, wherein the plurality of network security software components provide, at least in part, a plurality of security services capable of protecting a plurality of assets associated with a customer platform;
extending a virtual machine creation template to incorporate access to the plurality of network security software components;
receiving a virtual machine configuration from the customer platform, wherein the virtual machine configuration specifies
a first asset associated with the customer platform and having a first set of security requirements,
a second asset associated with the customer platform and having a second set of security requirements,
a first security service of the plurality of security services to protect the first asset in accordance with the first set of security requirements, and
a second security service of the plurality of security services to protect the second asset in accordance with the second set of security requirements; and
deploying a virtual machine on a second portion of the plurality of computing resources, wherein the virtual machine is configured in accordance with the virtual machine configuration to provide the first security service of the plurality of security services for the first asset associated with the customer platform and to provide the second security service of the plurality of security services for the second asset associated with the customer platform.

16. The computer-readable storage medium of claim 15, wherein the operations further comprise presenting a user interface element of the virtual machine creation template to the customer platform, wherein the user interface element allows a user of the customer platform to provide the virtual machine configuration.

17. The computer-readable storage medium of claim 15, wherein the asset is a virtualized asset operating within the distributed computing system.

18. The computer-readable storage medium of claim 15, wherein the operations further comprise:
provisioning the first security service to protect the first asset and the second security service to protect the second asset; and
providing the security service to protect the asset.

19. The computer-readable storage medium of claim 15, wherein the operations further comprise exposing an application programming interface through which the customer platform provides the virtual machine configuration.

20. The computer-readable storage medium of claim 19, wherein the operations further comprise:
calling a first application programming interface associated with a first network security software component of the plurality of network security software components to provide the first security service of the plurality of security services for the first asset; and
calling a second application programming interface associated with a second network security software component of the plurality of network security software components to provide the second security service of the plurality of security services for the second asset.

* * * * *